US007300641B2

(12) United States Patent
Courtaud et al.

(10) Patent No.: US 7,300,641 B2
(45) Date of Patent: Nov. 27, 2007

(54) METHOD AND DEVICE FOR CAPTURING RUTHENIUM PRESENT IN A GASEOUS EFFLUENT

(75) Inventors: Bruno Courtaud, Bellac (FR); Fabrice Morel, Les Pieux (FR); Georges Pagis, Cherbourg-Octeville (FR); Carol Redonnet, Equeurdreville (FR)

(73) Assignee: Compagnie Generale des Matieres Nucleaires, Velizy-Villacoublay (FR)

( * ) Notice: Subject to any disclaimer, the term of this patent is extended or adjusted under 35 U.S.C. 154(b) by 415 days.

(21) Appl. No.: 10/531,957

(22) PCT Filed: Feb. 6, 2004

(86) PCT No.: PCT/FR2004/050049

§ 371 (c)(1),
(2), (4) Date: Apr. 19, 2005

(87) PCT Pub. No.: WO2004/071640

PCT Pub. Date: Aug. 26, 2004

(65) Prior Publication Data

US 2006/0083670 A1 Apr. 20, 2006

(30) Foreign Application Priority Data

Feb. 10, 2003 (FR) .................................. 03 01538

(51) Int. Cl.

*B01D 53/64* (2006.01)
*B01D 53/78* (2006.01)
*B01D 53/80* (2006.01)
*G21F 9/02* (2006.01)

(52) U.S. Cl. ...................... 423/210; 422/168; 422/177; 422/180; 422/181; 588/1; 588/16

(58) Field of Classification Search ................ 423/210; 422/168, 177, 180, 181; 588/1, 16
See application file for complete search history.

(56) References Cited

U.S. PATENT DOCUMENTS 3,018,161 A * 1/1962 Erlebach et al. ............ 423/210

(Continued)

FOREIGN PATENT DOCUMENTS

EP 0 559 536 A 9/1993

(Continued)

OTHER PUBLICATIONS

Database WPI, Section CH, Week 198508, Derwent Publications Ltd., London, GB; AN 1985-049423 XP002257639 & SU 1 106 529 A (Tin Ind Res Inst), 7 août 1984 (Aug. 7, 1984) * abrégé *.

*Primary Examiner*—Timothy C. Vanoy
(74) *Attorney, Agent, or Firm*—Thelen Reid Brown Raysman & Steiner LLP

(57) ABSTRACT

The present invention relates to a method and a device for trapping ruthenium present in a gaseous effluent. The trapping method of the present invention comprises the use of an aqueous solution or slurry of an alkylene glycol polymer or an alkylene glycol copolymer, in which the alkylene(s) has (have) from 2 to 6 carbon atoms, in order to trap ruthenium present in a gaseous effluent. The ruthenium-trapping cartridge of the present invention has a surface (S) on which an alkylene glycol polymer or an alkylene glycol copolymer is placed, in which the alkylene(s) has (have) from 2 to 6 carbon atoms. The present invention makes it possible in particular both to favour the trapping and the chemical operation of reducing ruthenium oxide $RuO_4$.

22 Claims, 4 Drawing Sheets

U.S. PATENT DOCUMENTS 4,622,176 A * 11/1986 Motoki et al. ................. 588/2

FOREIGN PATENT DOCUMENTS

JP 59 042020 3/1984
JP 60 087855 5/1985
JP 63 243232 10/1988
JP 3-24499 A * 2/1991
JP 04 083199 3/1992
JP 5-126994 A * 5/1993
WO WO 01/07147 A 2/2001

* cited by examiner

METHOD AND DEVICE FOR CAPTURING RUTHENIUM PRESENT IN A GASEOUS EFFLUENT

CROSS-REFERENCE TO RELATED APPLICATION

This application claims priority based on International Patent Application No. PCT/FR02004/050049, entitled "Method and Device for Capturing Ruthenium Present in a Gaseous Effluent" by Bruno Courtaud, Fabrice Morel, Georges Pagis and Carol Redonnet, which claims priority of French Application No. 03/01538, filed on Feb. 10, 2003, and which was not published in English.

TECHNICAL FIELD

The present invention relates to a method and to a device for trapping ruthenium present in a gaseous effluent.

The invention is particularly applicable in the filtration of the gaseous effluents coming from the reprocessing of nuclear fuels that contain or are likely to contain ruthenium.

Ruthenium is one of the atomic fission products generated during the nuclear reaction. In this context, it is found in the irradiated fuel rods. It represents 6% by weight of all of the fission products, and its isotopes $^{103}Ru$ and $^{106}Ru$ are radioactive.

In the processes for processing nuclear fuels, the fuel rods are firstly sheared and dissolved in nitric acid. Most of the components making up the rods, including ruthenium, then pass into solution in the form of nitrates. This dissolution solution is then sent to liquid/liquid extraction shops. The ruthenium is present at this step of the process in the aqueous phase called the fission product (FP) solution. This solution is sent to the vitrification shops where it is calcined in a furnace and the elements in oxide form resulting therefrom are then vitrified.

Thus, ruthenium, like the other radioelements, is vitrified. Unfortunately, the oxide form $RuO_4$ is extremely volatile and, although trapped by the treatment carried out on the gaseous effluents coming from these processes, a fraction, albeit a minute one, is likely to escape, especially via the possible leaks in the processing circuit.

Ruthenium in this gaseous form $RuO_4$ can then be transferred into the building ventilation system and pass through the ventilation ducts. It then passes through all the filtration barriers of the ventilation system. It then gets into the primary stack and is discharged into the environment.

At the present time, in most irradiated fuel reprocessing plants, the gaseous effluents coming from the cells emitting ruthenium pass through a set of two filters that strip them of the coarsest particles and prevent too rapid clogging of the following filtration stages. They then pass through the first and second barrier filters placed in shielded containers.

It is in particular on these filter elements that the present invention, which constitutes a very effective means of preventing the discharge of ruthenium, can preferably be attached.

PRIOR ART

When the ruthenium is in the form of solid $RuO_2$, it is relatively simple to trap it using absolute filtration. This is currently the case in vitrification shops that possess several filtration barriers in their ventilation systems. The very high efficiency (VHE) filters of the first, second and third barriers prevent the passage of solid $RuO_2$ particles. Of course, the VHE filters trap only the $RuO_2$ that is formed upstream. If the reduction of $RuO_4$ takes place downstream of the VHE filters, it is obvious that $RuO_2$ may be discharged into the environment.

This is because the glass-fibre filter medium of the VHE barriers is not capable of stopping gaseous $RuO_4$, which can then pass into the stack, possibly being reduced to $RuO_2$ in transit. One way of stopping this $RuO_4$ therefore consists in reducing it to $RuO_2$ upstream of the filtration barriers and then in trapping it on a VHE filter.

It is also possible to pass the gaseous effluent containing ruthenium over a reducing medium such as poly(4-vinylpyridine) (PVP) or wet metal surfaces that act as catalysts. However, solid traps, which are effective at room temperature, particularly commercially available PVP, generate very substantial head losses and therefore require a significant increase in the power of the ventilation fans.

It is also possible to carry out a scrubbing operation on the gaseous effluent by means of an aqueous solution, possibly containing a reactant such as sodium hydroxide. However, the carbonation of sodium hydroxide by picking up atmospheric $CO_2$ requires substantial replenishment of the reactant, and therefore the generation of a large volume of liquid effluent.

In general, the efficiency of these systems proves to be limited. This is because the filter elements of the prior art stop most of the aerosols but are incapable of effectively stopping $RuO_4$.

Obviously from the environmental standpoint there is a real need to have an effective method of trapping ruthenium likely to be present in particular in the gaseous effluents coming from irradiated nuclear fuel reprocessing plants.

SUMMARY OF THE INVENTION

The inventors have developed a ruthenium trapping method and device that meet this need.

In particular, the method of trapping ruthenium present in a gaseous effluent of the present invention is characterized in that it comprises bringing the said gaseous effluent into contact with an aqueous solution or slurry comprising at least one alkylene glycol polymer and/or at least one alkylene glycol copolymer, in which the alkylene(s) has (have) from 2 to 6 carbon atoms.

The present invention also relates to the use of the aforementioned aqueous solution or slurry for trapping ruthenium present in a gaseous effluent.

The method of the invention may be employed either in a gas scrubbing unit, the polymer or copolymer then being used as a reactant added to the scrubbing water, or by manufacturing a ruthenium-trapping cartridge. The said cartridge comprises, for example, a substrate on which an alkylene glycol polymer or an alkylene glycol copolymer is placed, in which polymer or copolymer the alkylene(s) has (have) from 2 to 6 carbon atoms.

Thanks to the aforementioned polymer or copolymer in aqueous solution, for example used in a gaseous effluent scrubbing unit, the present invention makes it possible to achieve, unexpectedly, an efficiency comparable to that using sodium hydroxide while avoiding the aforementioned carbonation problem.

The scrubbing units that can be used for scrubbing a gaseous effluent using the method of the present invention are those known to a person skilled in the art. For example, the unit may be a packing column, a venturi scrubber, etc.

When a cartridge is used, the flexibility of the method and of the device of the present invention that are based on the aforementioned polymers and copolymers advantageously makes it possible to design ruthenium traps suitable for existing irradiated nuclear fuel processing plants. Furthermore, the amount of polymer that has to be used is very small, which really does prevent any safety problem and creates no difficulty in management of the waste produced by the invention when carrying out the periodic replacement operations that may be necessary.

The polymer or copolymer may be selected according to the operating conditions, for example according to the surface temperature, to the nature of the other chemical species present in the gaseous effluent, possibly according to the substrate used, to the cost, to the ventilation power, etc. According to the invention, the properties of choice of the polymers and copolymers that can be used in the present invention may be the following:

- the polymer or copolymer is advantageously soluble in water so that it can be deposited on a substrate by impregnation of aqueous solutions;
- the composition of the polymer or copolymer is advantageously simple, for example consisting solely of carbon, oxygen and hydrogen, thereby reducing the costs of the method and the device of the present invention; and
- the polymer or copolymer is capable of trapping the $RuO_4$ owing to the fact that it contains one or more reducing groups —OH by analogy with the reducing effect of sodium hydroxide.

Preferably, the polymer or copolymer has hydroxyl end groups. In this case, these are alkylene glycol polymers and copolymers terminated with hydroxyl end groups.

Advantageously, according to the invention, the alkylene glycol polymer may for example be selected from the group consisting of polyethylene glycol, polypropylene glycol, polybutylene glycol or a blend of these.

Advantageously, the alkylene glycol copolymer is a copolymer consisting of polymers selected from the group consisting of polyethylene glycol, polypropylene glycol and polybutylene glycol. For example, the alkylene glycol copolymer may be a copolymer based on ethylene glycol, propylene glycol and butylene glycol at the same time.

Advantageously, according to the invention, the alkylene glycol copolymer may be of the following formula (I):

$$HO-(CH_2-CH_2O)_m-(\underset{\displaystyle CH_3}{\underset{|}{CH}}-CH_2O)_p-(CH_2-CH_2O)_m-H \qquad (I)$$

in which m and p are integers such that, independently, $1 \leqq m \leqq 8$ and $3 \leqq p \leqq 12$.

The copolymer of formula (I) may for example be a polyethylene glycol/polypropylene glycol copolymer.

According to the invention, a solution or slurry of an aforementioned polymer or an aforementioned copolymer alone, of a blend of various aforementioned alkylene glycol polymers, or of a blend of various aforementioned alkylene glycol copolymers, or of a blend of one or more aforementioned polyalkylene glycols and of one or more aforementioned alkylene glycol copolymers may be used in the method and the device of the present invention. Also, in the present description, the expression "polymer or copolymer" and the expression "alkylene glycol polymers or copolymers" cover, of course, these various embodiments of the present invention.

For trapping ruthenium on a solid substrate, the aforementioned polymers furthermore have the advantage of being able, because of their wetting properties, to be easily deposited as thin layers on a substrate, thus offering better characteristics in terms of head loss and of developed surface area than the products of the prior art.

Thus, when a substrate is used to implement the present invention, the aqueous polymer or copolymer slurry is placed on the substrate. This embodiment advantageously makes it possible to reduce the interfacial surface tension between the substrate and the ambient moisture and thus favour the trapping of water from the water contained in the gaseous effluent to be treated on the surface of the substrate, thus making it easier to absorb the ruthenium and to reduce it.

The forms of ruthenium covered by the present invention are essentially $RuO_4$ and $RuO_2$. After contact with the substrate, the $RuO_4$ may be absorbed by the polymer or copolymer placed on the surface and react with the latter. This is because the aforementioned polymers and copolymers favour the absorption of $RuO_4$ and limit its desorption, and therefore allow the $RuO_4$ to remain on the surface for a long enough time for it to be reduced. Furthermore, the hydroxyl functional groups of these polymers and copolymers reduce this form of ruthenium to $RuO_2$. The present invention therefore makes it possible both to favour the trapping of $RuO_4$ ruthenium and the chemical operation of its reduction.

Also advantageously according to the invention the substrate may be preferably selected so that it has a large area of contact with the gaseous effluent to be treated for a low head loss. This is because the ruthenium present in the effluent comes into contact with the surface by collision, and it is preferable for the collision factor to be as high as possible so that the maximum amount of ruthenium is trapped. Thus, very preferably, the substrate is a divided substrate, for example a substrate in the form of fibres, for example a wool or mass of fibres, preferably one that is not compacted when it is desired to avoid head losses by the flow of the gaseous effluent through said substrate. A fibrous substrate furthermore has the advantage of retaining the possible solid ruthenium ($RuO_2$) particles. In the case of such a substrate, the contacting with the gaseous effluent will advantageously take place by forcing the said effluent to pass through the fibrous substrate.

According to the invention, the substrate may for example be a metal wool, preferably of low density and of highly developed surface area, such as a stainless steel wool. This is because such a substrate makes it possible to achieve a very high efficiency, while generating only a very low head loss, not requiring the existing ventilation fans to be changed. The substrate may also be a glass wool.

The polymer or copolymer may be placed on the substrate by any suitable means known to those skilled in the art. Preferably, for example when the substrate is fibrous, this means prevents the substrate from being clogged so that the gaseous effluent can pass through it, if necessary limiting the head losses. Advantageously, the polymers and copolymers used in the present invention are soluble in water and therefore allow aqueous solutions, called impregnation solutions, to be prepared, these being practical for placing the polymers or copolymers on the substrate, for example by simply dipping it into the said impregnation solutions. The concentration of the solution will in particular be determined according to the amount of polymer or copolymer to be placed on the substrate. The manufacture of this solution and the impregnation are described in the examples below.

Preferably, after impregnation, the substrate, for example the fibres of which it is composed, will be covered with a thin layer or film of aqueous slurry of the selected polymer or copolymer over its entire surface, that is to say, in the case of fibres, over all its constituent fibres.

According to the invention, the operation of contacting the effluent with the solution or slurry of the polymer or copolymer, optionally deposited on a substrate, may be carried out at a suitable temperature so that the contacted materials (polymers, substrate) are not destroyed. This operation will in general be carried out at a temperature ranging from 20 to 50° C.

In the device of the present invention, the cartridge may furthermore comprise a structure supporting the substrate on which the alkylene glycol polymer or copolymer is placed. According to the invention, this structure, in addition to its function of supporting the said substrate, may be a structure suitable for the insertion of the cartridge into a possibly pre-existing gaseous effluent line. For example, it may be in the form of a basket. This structure is preferably made of a material suitable for its use under the conditions of the present invention, for example stainless steel. In general, the said structure gives the cartridge its geometry.

According to the invention, the geometry of the said cartridge is preferably designed so that it can be placed, advantageously in a removable manner, in a ruthenium-containing gas line so as to force the gaseous effluent to pass through the said cartridge. Thus, this allows prefabrication of modules, which consist of the substrate and a support, the fitting of which requires no modification of the units nor of the procedures. Furthermore, the cartridge may be provided with peripheral seals intended to force the said ruthenium-containing gaseous effluent to pass through the said cartridge, preferably without any loss. This may be important in order to force the effluent to pass through the polymer-impregnated or copolymer-impregnated substrate, and avoid any loss, so as to trap all of the ruthenium present in the effluent in the cartridge.

In a preferred embodiment, the cartridge of the present invention may therefore comprise:

- the substrate on which the alkylene glycol polymer or copolymer is placed, the said surface being in the form of glass wool or stainless steel wool;
- a structure, or support, supporting the said substrate on which the alkylene glycol polymer or copolymer has been placed, the said structure preferably being in the form of a basket, preferably a latticed basket; and
- peripheral means for sealing the said cartridge, for example seals, for example of the type made of Viton (brand name) or silicone, making it necessary for the gaseous effluent to pass through the said substrate.

According to the invention, one or more cartridges may of course be used if necessary, for example mounted in series, so that the gaseous effluent can pass through them in succession.

The ventilation systems involved in the present invention for trapping ruthenium are especially those for extraction and for treatment of the vitrification cells, and also those for the cells for dismantling irradiated nuclear fuel reprocessing plants. The ventilation systems for reprocessing plants are generally composed of several filtration barriers:

- medium-efficiency (ME) pre-prefilters and high-efficiency (HE) prefilters directly in the cell;
- very high-efficiency (VHE) filters for the first and second barriers in shielded containers;
- VHE filters for the third barrier in sealed airlock containers; and
- HE traps at the base of the stack.

To succeed in trapping the $RuO_4$, at least one cartridge of the present invention may for example be inserted in one or more of the aforementioned filter elements. One embodiment of the present invention in a plant will be described below in the examples.

A cartridge according to the invention may be positioned either in the first barrier or in the second barrier. The filter elements of the first barrier will preferably be replaced at least about every two years. They will be changed in particular when they become too highly irradiating owing to trapped radioactive particles, and possibly in the event of them being clogged. The filter elements of the second barrier are in general more rarely replaced, as no substantial rise in irradiation or in clogging is observed therein.

Fitting the ruthenium trapping system of the present invention in the first barrier has the advantage, should it suffer a loss of efficiency, of benefiting from the periodic changing of this first barrier. However, when installed in this way, the ruthenium trapping substrate or medium will undergo more substantial irradiation, liable to accelerate its ageing.

Other features and advantages of the present invention will become further apparent to those skilled in the art on reading the illustrative examples that follow, with reference to the appended figures.

EXAMPLES

Example 1

Example of Polymers and Copolymers that can be Used According to the Present Invention Grouped together in Table 1 below are various polymers, copolymers and blends that can be used in the present invention.

They are commercially available, for example from:

Lambert Rivière (manufacturer: ICI);

Albright & Wilson;

Roth Sochiel.

TABLE 1

| Name | Meaning | Melting point (° C.) |
|---|---|---|
| PEG | Polyethylene glycol | — |
| 300 to 35 000 PEG | Polyethylene glycols having molecular weights ranging from 300 to 35 000 g/mol | — |
| Copol 1 | Polyethylene glycol/polypropylene glycol block copolymer | <0 |
| Copol 2 | Ethylene glycol/propylene glycol/butylene glycol copolymer | 27 |
| Copol 7 | PEG 2000 + PEG 300 in proportions of 50/50 by weight | 25 |
| Copol 9 | PEG 2000 + PEG 300 + Copol 1 in proportions of 70/20/10 by weight | 34 |
| Copol 10 | PEG 2000 + PEG 300 + Copol 1 in proportions of 45/45/10 by weight | 23 |
| Copol 11 | PEG 2000 + Copol 2 in proportions of 50/50 by weight | 38 |
| Copol 14 | Copolymer based on ethylene glycol, propylene glycol and butylene glycol | 37 |

Example 2

Example of Ruthenium Trapping by a Copolymer According to the Present Invention Stainless steel wool (fibre diameter (Ø): 12 μm), called WB12 (trade name), specimens, as substrates, were impregnated with a 5 wt % solution of a copolymer according to the present invention. The copolymer of the present invention, used here, which has surfactant properties, is a PEG/PPG (polyethylene glycol/polypropylene glycol) copolymer, which is liquid at room temperature, denoted in the above Table 1 by Copol 1. It comes from Albright and Wilson, with the trade name AMPLICAN.

The operating conditions for the trials were the following:

temperature: 18.5° C.;

relative humidity: 42%;

[$O_3$]: 1.8 mg/l;

flow rate: 2.24 $m^3$/h;

duration of the trial: 5 h;

1 unimpregnated disc+3 WB12 discs impregnated 100% with Copol 1.

Figure 1:
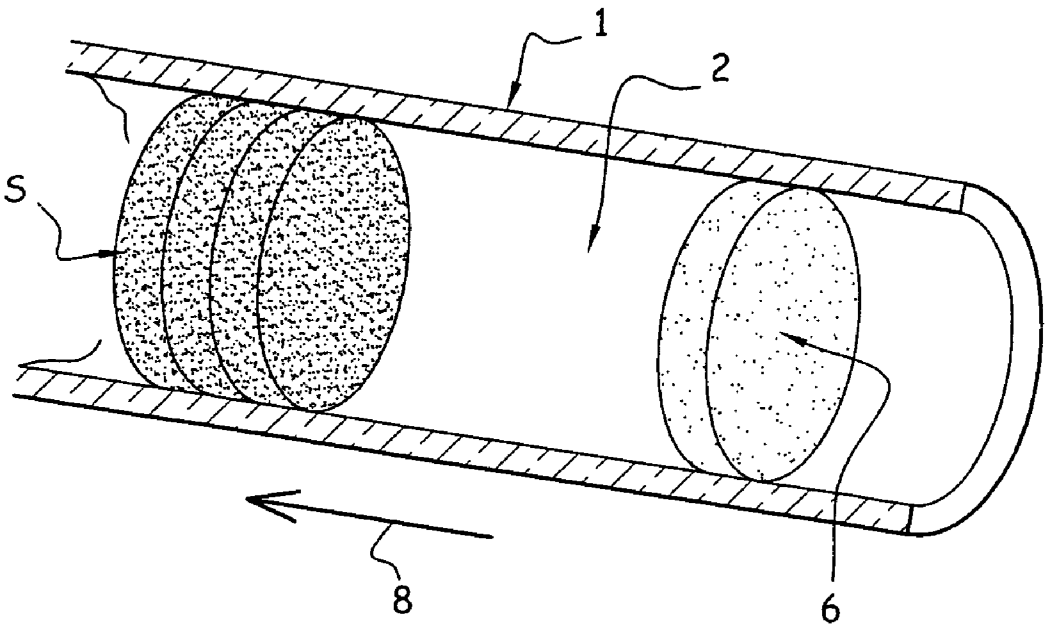
FIG. 1 shows a test bed used for testing the present invention. It consists of a glass tube in which stainless steel discs (S) impregnated with polymer or copolymer according to the invention and a unimpregnated control disc have been placed. A ruthenium-containing gaseous effluent is made to flow through this tube.

FIG. 1 shows a test bed (1) used for this example. It consists of a glass tube (2) in which the three WB12 discs (S) 100% impregnated with Copol 1 and the unimpregnated stainless steel control disc (6) have been placed. The arrow (8) indicates the direction of flow of the ruthenium-containing gaseous effluent through the tube.

The three discs and the upstream control disc of the traps were analyzed—the amount of trapped ruthenium ($Q_{Ru}$) in the discs is given in Table 2 below. The % trapped Ru corresponds to the amount of ruthenium trapped on a disc relative to the total amount of ruthenium generated. The trapped % of Ru impinging on the trap corresponds to the amount of ruthenium trapped on a disc relative to the amount of ruthenium impinging on this disc.

A guard placed downstream of the device allows the amount of Ru not trapped by the discs to be determined.

TABLE 2

| | Unimpregnated WB12 disc | Disc 1: WB12 + Copol 1 | Disc 2: WB12 + Copol 1 | Disc 3: WB12 + Copol 1 | Guard |
|---|---|---|---|---|---|
| $Q_{Ru}$ (mg) | 0.056 | 0.818 | 0.212 | 0.014 | <0.01 |
| % Ru trapped | 5 | 74 | 19 | 1 | — |
| Trapped % of Ru impinging on the trap | 5 | 78 | 94 | — | — |

Figure 2:
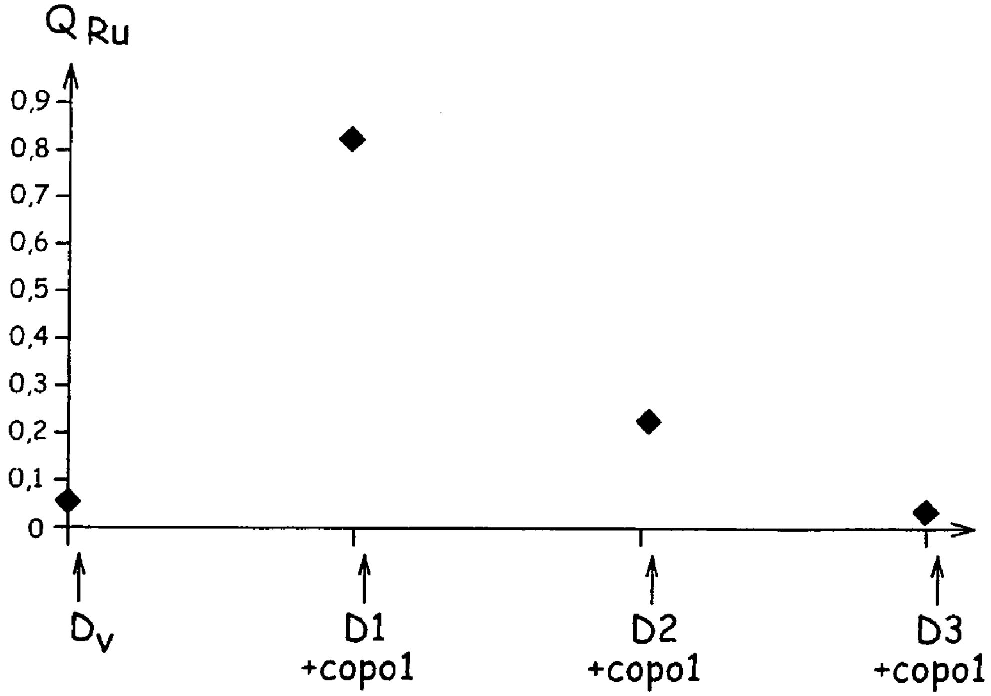
FIG. 2 is a graph illustrating the amount of ruthenium retained from the effluent by being trapped in stainless steel discs impregnated with polymer or copolymer according to the invention and an unimpregnated stainless steel control disc.

The results are plotted on the graph in appended FIG. 2. In this figure, "$D_u$" indicates the unimpregnated stainless steel disc and "D1, D2 and D3" indicate the various aforementioned discs, in the direction of flow of the gaseous effluent (from D1 towards D3). The results are very satisfactory since practically all of the ruthenium has been trapped on the three traps mounted in series.

Example 3

Effect of Increasing the Melting Point of the Polymer or Copolymer According to the Invention To study the impact of a change in melting point of the polymer on its efficiency, the inventors worked on a series of polymers of the same family, for which only the molecular weight and the hydroxyl number varied.

These polymers were polyethylene glycols (PEGS) whose characteristics are given in Table 3 below:

TABLE 3

| | State at room temperature | Molecular weight (g/mol) | Melting point (° C.) | Hydroxyl number $I_{OH}$ |
|---|---|---|---|---|
| PEG 600 | Liquid | 600 | 15-25° C. | 178-197 |
| PEG 1500 | Solid | 1500 | 42-48° C. | 70-80 |
| PEG 35 000 | Solid | 35 000 | 60-65° C. | 3-4 |

Figure 3:
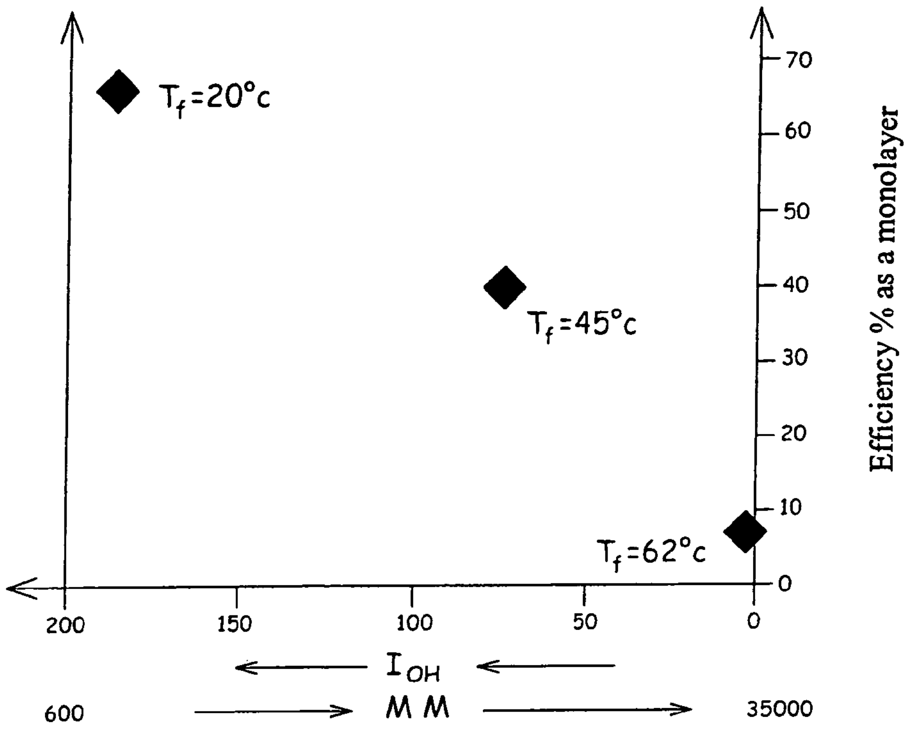
FIG. 3 is a graph showing the ruthenium trapping efficiency (in % as a monolayer) at room temperature of a layer of WB12 (trade name) substrate impregnated with polymers differing by their molecular weight (MW), with a degree of impregnation of about 100% by weight.

The graph in FIG. 3 shows the trapping efficiency at room temperature of a layer of WB12 substrate impregnated with polymer at a level of about 100% by weight (polymer mass=stainless steel mass).

The capture efficiency greatly decreases with an increase in molecular weight (MW) and with a reduction in hydroxyl number ($I_{OH}$). These two properties vary inversely with each other—the hydroxyl number is an indicator of the number of polymer chain ends (HO-ether chain-oxide-OH). If a polymer chain is shortened, the number of chain ends (OH) is increased while, on the other hand, its molecular weight decreases. These parameters are linked in the manner indicated in Table 4 below:

TABLE 4

| | Molecular weight | Hydroxyl number |
|---|---|---|
| PEG 1500 ↓ PEG 600 | Reduced by a factor of 2.5 | Increased by a factor of 2.5 |

The higher the melting point of a polymer is raised, so as to increase its mechanical strength, the less effective it appears. There is therefore a compromise to be found between mechanical strength and efficiency, which a person skilled in the art would readily be able to find from the present description.

For the following examples, the inventors have chosen to adopt the polymers that have a melting point lying within the selected operating range of about 40° C.

At this temperature, the polymer is waxy, that is to say non-liquid, in the form of a soft solid.

Example 4

Polymer Blends

In parallel with seeking a polymer whose melting point is 40°, the inventors produced polymer blends allowing a 40° C. melting point of the blend to be achieved. The basis of the blend was to combine a polymer having a high molecular weight and a high melting point with a low-mass polymer which provides it with the surface activity and the hydroxyl number.

The blends prepared were Copol 7, Copol 11, Copol 2, Copol 9 and Copol 10 defined in Table 1 above.

WB12 stainless steel wool was impregnated to an amount of about 100% by each of these blends, before the test on the test bed described above. The tests were carried out at 20° C. and 40% relative humidity.

Figure 4:
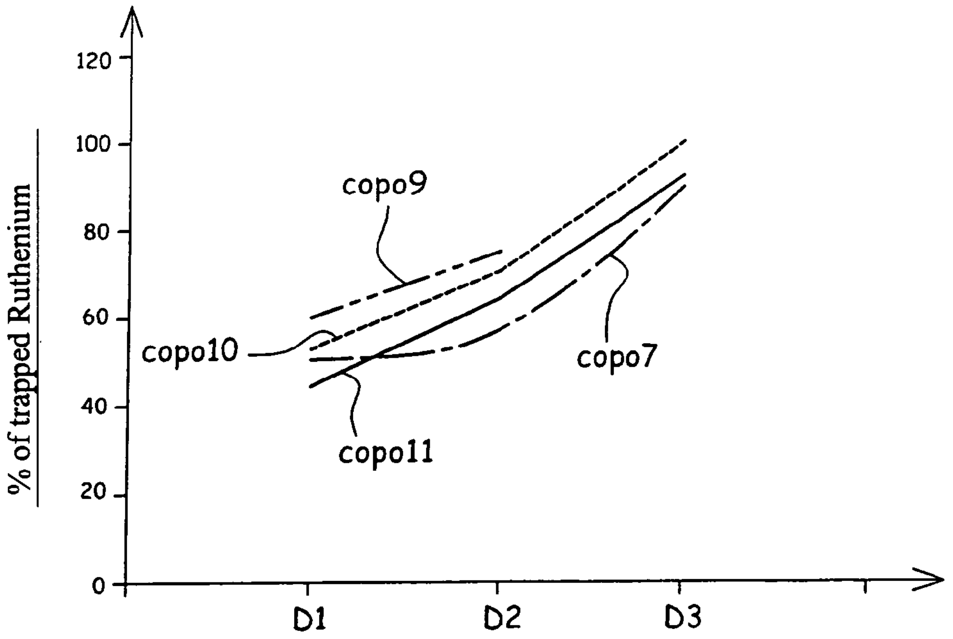
FIG. 4 is a graph indicating the % trapped ruthenium by weight for each disc D1, D2 and D3 of the test bed of FIG. 1, using various polymers and copolymers according to the present invention.

The results are given in the graph shown in the appended FIG. 4 which indicates the % by weight of ruthenium trapped for each disc D1, D2 and D3.

The fact that the efficiency of the layer 3 is greater than that of the upstream layers results from saturation of these upstream layers with Ru. All the products tested were very effective, but the selection was made based on, as single criterion, lead time constraints and therefore commercial availability of the reactants.

Since PEG 2000 and Copol 2 were available in sufficient quantity for carrying out impregnation on an industrial scale, the inventors took Copol 11 as reference product in this example.

A blend may sometimes have drawbacks, such as demixing, which may result in the behaviour of the polymer being modified over time. This is why, advantageously, according to the invention, copolymers are preferred and especially those having all the characteristics of Copol 11 in terms of melting point and efficiency. A copolymer having these useful characteristics is, for example, Copol 14, which is a copolymer based on ethylene glycol, propylene glycol and butylene glycol, sold for example by Lambert Rivière (manufacturer ICI) under the trade name SYMPERONIC A20.

Example 5

Impregnation of a Substrate

The impregnation with the copolymer on the substrate is an important step in producing the trap cartridge according to the invention. If this is carried out incorrectly, and especially if the copolymer does not cover all of the substrate, for example all of the stainless steel wool as in this example, the cartridge may let some $RuO_4$ through and the efficiency of the cartridge will in general be affected. In addition, it is necessary for the impregnation to be homogeneous in order not to create preferential paths.

These trials were therefore aimed at controlling the amount of polymer or copolymer deposited on a substrate during the impregnation step.

The first trials consisted in varying the concentration of the impregnation polymer. The substrate was a WB12 (trade name) stainless steel wool. The WB12 stainless steel wool specimens in this example had dimensions of 70×100 mm. They were immersed in the polymer solution and then placed on a metal (stainless steel) mesh before drying overnight at 40° C. The impregnation results are given in Table 5 below:

TABLE 5

| [Copol 14] (g/l) | WB12 (g) | Dry WB12 + Copol 14 (g) | Degree of impregnation |
|---|---|---|---|
| 100 | 1.8802 | 3.8863 | 107% |
| 50 | 1.8729 | 2.7011 | 44% |
| 25 | 1.8388 | 2.2501 | 22% |
| 10 | 1.9469 | 2.1190 | 9% |
| 5 | 2.1222 | 2.2135 | 4% |

The amount of polymer deposited therefore varied almost linearly with the concentration of the impregnation solution.

The inventors therefore adopted, by practical choice, a 10 g/l impregnation solution for manufacturing the industrial traps from this wool.

In the same way, trials were carried out with WB22 (trade name) stainless steel wool. This stainless steel wool differs from WB12 (trade name) by the diameter of the fibres (12 μm in the case of WB12 and 22 μm for WB22). The weight per unit area of each layer remained the same for both wools (300 $g/m^2$). The inventors used a 25 g/l impregnation solution for this wool.

The impregnation results are given in Table 6 below:

TABLE 6

| [Copol 14] (g/l) | Degree of impregnation |
|---|---|
| 40 | 27% |
| 30 | 18% |
| 25 | 10% |
| 20 | 7.5% |
| 15 | 6% |

The amount of polymer deposited therefore varied almost linearly with the concentration of the impregnation solution. The 25 g/l concentration was used here.

To control the uniformity of polymer deposition on the surface of the substrate formed from stainless steel wool (WB12), the inventors subjected a WB12 disc impregnated with Copol 14 to a stream of ruthenium-containing air.

They observed this specimen under a scanning electron microscope (SEM). They then compared the X-ray image of the specific lines of ruthenium on the same specimen and showed clearly that these two images were superposable and almost identical. This confirmed that the ruthenium was deposited uniformly on the surface of the stainless steel wool and therefore that the polymer covered the stainless steel wool fibres perfectly.

Example 6

Resistance of the Polymer to NOx and to Ozone

Since nitrogen oxides or nitrous vapours (NOx) and ozone are possibly present in industrial gaseous effluents, the inventors carried out tests on the behaviour of the Copol 14-impregnated support with respect to NOx and ozone.

The Copol family is sensitive to NOx and the reaction results in the formation of degradation products that are unstable and decompose, releasing heat. However, this reaction is neither explosive nor violent.

In the same way as for NOx, stainless steel wool 30% impregnated with Copol 14 was subjected to an ozone stream using, for this, the test bed described above. The conditions were defined on the basis of the assumption of ozone generation by radiolysis of air. Specimens were subjected to a 2.5 $m^3/h$ stream of ozonated air with an ozone content of 0.7 $g/m^3$ of wet air.

Copol 14 seems to behave in a similar manner with respect to NOx and to ozone. However, the ozone-induced degradation phenomena are much less accentuated: less heat is generated, exotherms starting at 85° C.

Example 7

Ruthenium Trapping Device According to the Invention

The solution presented in this example made it possible to avoid any modification of the installations in place. It consisted in placing the ruthenium trap of the present invention and the core of a cylindrical VHE filter of the second barrier. This was produced by cutting the upper strips of the filter and inserting a basket containing Copol 14-impregnated WB12 wool.

Copolymer

The copolymer selected in this example was Copol 14 (see Table 1).

Substrate

The substrate selected was a stainless steel wool because this offered a large contact area with the gaseous effluent for a lower head loss. The stainless steel wool WB12 (trade name) is composed of stainless steel fibres with a diameter of 12 microns. Its specific surface area is 13 $m^2/m^2$ for a wool 7 mm in thickness, i.e. about 1857 $m^2/m^3$ of non-compacted wool. Its weight per unit area is 300 $g/m^2$, i.e. about 43 $kg/m^3$ (again not compacted).

Impregnation

Several impregnation techniques were tested with the objective of impregnating the trap entirely; basket+2 kg of stainless steel wool. After many trials, it was decided to impregnate, sheet by sheet, stainless steel wool and to assemble the trap as follows. The intended degree of impregnation was 5% using the method of immersing the sheets of stainless steel wool.

A quality criterion was set in this experiment, this consisting in discarding any sheet whose degree of impregnation was less than 2% or greater than 10%. Thus, for a trap containing about 2 kg of stainless steel wool, the maximum amount of Copol 14 was 200 g. The impregnation solution used was 10 g of copolymer per litre of water (see the example above). The impregnated wool was dried flat at 40° C.

The Cartridge

Figure 5:
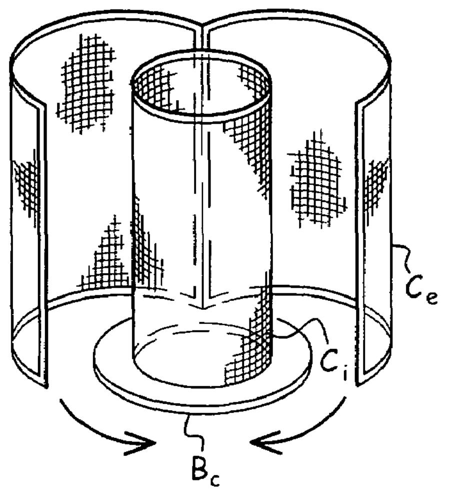
FIG. 5 is a diagram showing a structure intended to support the substrate impregnated with polymer or copolymer according to the invention. This structure comprises two concentric mesh cylinders.

The basket-type metal support of the trap cartridge had the shape of a double cylinder, as shown in the appended FIG. 5, namely an internal cylinder ($C_i$) and an external cylinder ($C_e$). The internal cylinder ($C_i$) was made of perforated C10U12 stainless steel sheet, i.e. perforated with holes of 10 $mm^2$ and a centre-to-centre distance of 12 mm (mesh). This cylinder was welded to a circular base ($B_c$) made of a stainless steel sheet of larger diameter, with a hole at its centre in order to allow passage of a shaft for supporting the filter element (if such a cylinder is needed; a support with no hole at its centre is of course possible).

Figure 6:
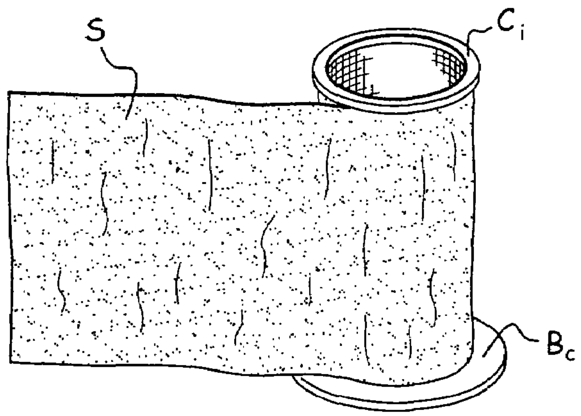
FIG. 6 is a diagram showing how a substrate impregnated with polymer or copolymer according to the invention may be placed (in this case wound) around the central cylinder of the structure shown in FIG. 5.

Eight layers of copolymer-impregnated stainless steel wool were wound around the first cylinder ($C_i$), which layers formed the substrate (S) as shown in FIG. 6. Two additional layers of stainless steel wool, not impregnated with copolymer, were then added on top. The external cylinder ($C_e$) covered the stainless steel wool and comprised a stainless steel mesh measuring 12.7×12.7. The base of the support was a flat bottom made of stainless steel, with a hole so as to allow passage of the shaft for supporting the VHE filter element. The trap cartridge therefore possessed in total 10 layers of stainless steel wool. The two layers wound last were not impregnated, that is to say contained no copolymer. They prevented any migration of the impregnation copolymer to the outside of the element.

Figure 7:
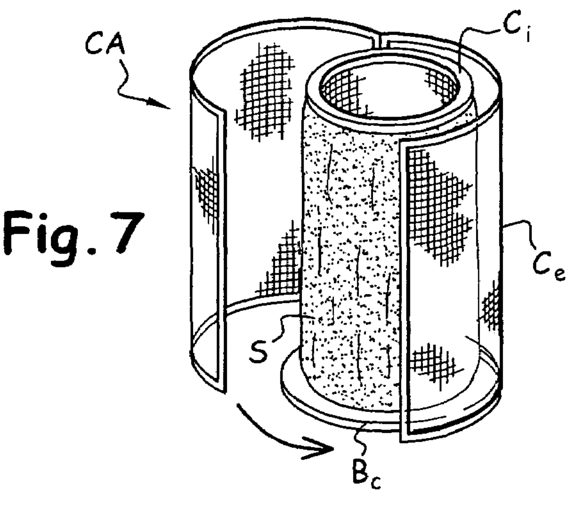
FIG. 7 is a diagram showing how the outer cylinder of the structure shown in FIG. 5 is fitted around the substrate wound around the central cylinder shown in FIG. 6, in order to form a cartridge according to the present invention.

The cartridge (CA) obtained according to the invention is shown in FIG. 7. Its total mass, consisting of the basket+wool+copolymer, was about 8 kg distributed approximately in the following manner:

- basket structure: about 5.5 kg;
- stainless steel wool: between 2 and 2.5 kg;
- copolymer deposited: 200 g (maximum);
- Viton (trade mark) and silicone seals (idem VHE): 300 to 400 g.

Insertion of the Cartridge According to the Invention into an Existing Unit

Figure 8:
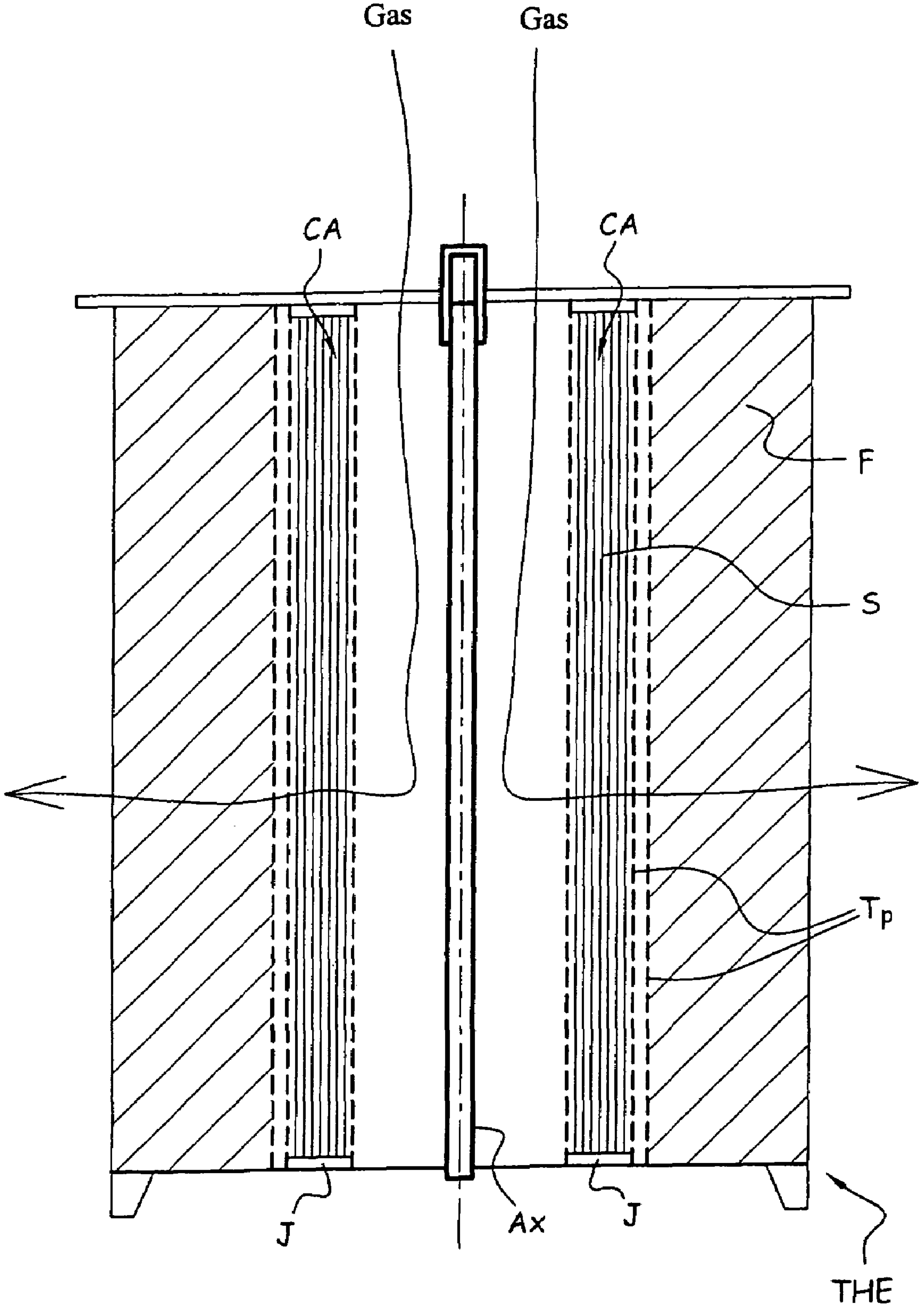
FIG. 8 is a representative diagram of a VHE filter in which the cartridge according to the invention shown in FIG. 7 has been placed.

To conclude, the trap cartridge manufactured according to the invention was inserted inside a VHE filter element consisting of glass fibres (F) supported by a perforated sheet ($T_p$). The whole assembly is shown in the appended FIG. 8.

The supporting shaft (Ax) was therefore removed from the filter element (F) and the trap cartridge (CA) slid onto the inside of it. A silicone seal (J) was then applied at the ends of the trap cartridge in order to ensure adhesion and sealing between the trap cartridge and the filter element (F). The support shaft was then put back into place. The filter element and its trap cartridge were ready to be fitted into the shielded containers of vitrification shops.

Head Loss Measurements

The head loss measurements were carried out on this assembly for various flow rates of gas to be treated. They are given in Table 7 below.

These values were measured on several trials to ±25%.

The impregnation of the stainless steel wool with the copolymer therefore had, in the present case, no significant effect on the head loss.

TABLE 7

| Flow rate | m$^3$/h | 1000 | 2000 | 3000 |
| --- | --- | --- | --- | --- |
| Head loss in the VHE filter element | Pa | 90 | 180 | 270 |
| Head loss in the trap cartridge support | Pa | 40 | 100 | 200 |
| Head loss in the 10 stainless steel wool layers | Pa | 110 | 200 | 360 |
| Total | Pa | 240 | 480 | 830 |

Example 8

Active Agent Trial

An experimental loop comprising, in this order; one or two experimental cartridges in series (Exp. 1 and Exp. 2) according to the present invention, no or one PVP cartridge, a filter paper and two PVP cartridges in series (PVP1 and PVP2), a volumetric counter and a pump were manufactured. The gaseous effluent passed through this loop in the above order. The diameter of the cartridges was 5 cm. The draw-off rates allowed flow speeds (empty drum) of 0.5 to 1 m/s to be achieved, these being representative of the flow speeds in the 2nd barrier VHE filters of existing irradiated fuel reprocessing plants.

The device was fitted in a vitrification shop, downstream of the filters.

A first series of trials was carried out on a 100% Copol 1-impregnated glass wool. The results are given in Table 8 below, in which $^{106}$Ru.Rh (Bq) represents the amount of ruthenium (and its descendent, rhodium) measured by radiometry.

TABLE 8

| | $^{106}$Ru.Rh (Bq) | | | | | |
| --- | --- | --- | --- | --- | --- | --- |
| | Exp. 1 | PVP | Filter paper | PVP1 | PVP2 | Volume (m$^3$) |
| 1 week | 320 | 6.2 | <5.7 | <8.6 | <7 | 620 |
| 2 weeks, new cartridge | 410 | 4.9 | 4.2 | <7.7 | <6.7 | >200 |

Over one week of operation, the results were encouraging, the PVP just downstream of the experimental cartridge being at the limit of detection, indicating that no leakage had taken place.

A second series of trials was carried out on WB12 stainless steel wool impregnated with Copol 1 to 100%. The cartridge consisted of 8 layers of WB12. It was left in place for an endurance test.

The results are given in Table 9 below:

TABLE 9

| | $^{106}$Ru.Rh (Bq) | | | | | |
| --- | --- | --- | --- | --- | --- | --- |
| | Exp. 1 | PVP | Filter paper | PVP1 | PVP2 | Volume (m$^3$) |
| 7 days | ns | <6.3 | 5.4 | 5.5 | <7.8 | 533 |
| 14 days | ns | <7.8 | 6.2 | 5.8 | <6.1 | 309 |
| 21 days | ns | 18 | 9.2 | 16 | <6.3 | 359 |
| 31 days | 6500 | 600 | 160 | 1100 | 40 | 1226 |
| 38 days | 5900 | 2500 | <6.8 | <8.2 | 17 | 396 |

(ns: not sampled)
$^{106}$Ru.Rh (Bq) represents the amount of ruthenium (and its descendent, rhodium) measured by radiometry.

After 21 days testing, the inventors suspected a leak and the cartridge was removed 7 days later. The results on the downstream PVP, and the repositioning of the cartridge for 7 days, confirmed this leak, which was due to slow migration of the Copol 1, this product being too fluid under the test conditions (40° C.).

A third series of trials consisted in evaluating the efficiency of a WB22 stainless steel wool impregnated with Copol 2 sold for example by Lambert Rivière (manufacturer: ICI), under the trade name SYMPERONIC A11. It was used in an amount of 22%. The cartridge consisted of a single layer of WB22. The results are given in Table 10 below:

TABLE 10

| | $^{106}$Ru.Rh (Bq) | | | | | |
| --- | --- | --- | --- | --- | --- | --- |
| | Exp. 1 | Empty cartridge | Filter paper | PVP1 | PVP2 | Volume (m$^3$) |
| 7 days | 4000 | 110 | 74 | 92 | 7.5 | 1054 |

A single layer already proved to be very effective, despite a flow speed from 2 to 3 times higher than during the previous trials.

The fourth trial was an endurance trial in a configuration similar to that used for the second barrier traps, namely 8 layers of WB12 impregnated with 5.7% Copol 14 (these 8 layers were distributed over 2 cartridges (Exp. 1 and Exp. 2), i.e. 8 cm in thickness). The results are given in Table 11 below:

TABLE 11

| | $^{106}$Ru.Rh (Bq) | | | | | |
| --- | --- | --- | --- | --- | --- | --- |
| | Exp. 1 | Exp. 2 | Filter paper | PVP1 | PVP2 | Volume (m$^3$) |
| *9 days | 8600 | 280 | 57 | 71 | 25 | 858 |
| 20 days | ns | ns | 3.7 | ns | 5 | 970 |
| 25 days | ns | ns | 4.1 | <7.4 | <7.1 | 369 |
| 32 days | ns | ns | <5.4 | <8.4 | <4.9 | 621 |
| 39 days | ns | ns | <7 | <9.6 | <8.2 | 596 |
| 49 days | ns | ns | <7.2 | <4.2 | <8.8 | 723 |
| 56 days | ns | ns | <4.7 | <3.1 | <4.4 | 528 |
| 63 days | ns | ns | <5 | <6.5 | <7 | / |
| 70 days | ns | ns | 6.7 | <7 | <6.9 | 586 |
| 79 days | ns | ns | <6 | <7.2 | <7 | 759 |
| 86 days | ns | ns | <6.2 | <4.2 | <6.8 | 504 |
| 93 days | ns | ns | <5.2 | <7.4 | <8.7 | 539 |
| 100 days | ns | ns | <4.7 | <5.9 | <7 | 561 |
| 109 days | ns | ns | 17 | 8 | <8 | 830 |
| 118 days | ns | ns | 26 | <7.9 | <7.4 | 563 |
| 124 days | ns | ns | 22 | <9.2 | <6.5 | 443 |
| 133 days | ns | ns | 18 | <8.7 | <6.8 | 619 |
| 140 days | ns | ns | 10 | <7.4 | <7.4 | 585 |
| 144 days | 34 000 | 430 | <8.1 | <7.4 | <7.5 | 320 |

ns: not sampled
After 144 days of the trial, corresponding to the treatment of 11 790 m$^3$, the experimental cartridges were removed without any lowering of efficiency being observed.
*A sealing fault was identified, manifested by a slight activity on the PVPs. The cartridges were removed in order to fit seals and were counted before being reinstalled.

Example 9

Ruthenium Trapping by an Aqueous Copolymer Solution

According to the invention, the ethylene glycol, propylene glycol and butylene glycol polymers and copolymers can be used as reactants added to the scrubbing water in a gas scrubbing unit (packing column, venturi, etc.).

Specifically, comparative trials were carried out with various reactants, in which $RuO_4$-laden air flowed over the surface of the liquid. The physical parameters (geometry and air speed) were the same for all the trials, only the chemical composition for the solution varying.

The results given in Table 12 below show, for example, that an ethylene glycol/propylene glycol copolymer, called here Copol 1, is very effective for absorbing $RuO_4$.

TABLE 12

| | $RuO_4$ generated ($10^{-6}$ mol) | $RuO_4$ absorbed ($10^{-6}$ mol) | % absorbed | pH (measured or calculated) |
|---|---|---|---|---|
| Trials with pure water | | | | |
| Pure water: Trial A | 19.04 | 6.02 | 31.6 | 5.7 |
| Pure water: Trial B | 9.80 | 3.21 | 32.8 | 5.7* |
| Trials in the presence of reactants | | | | |
| $Na_2CO_3$(0.4M) + $NaHCO_3$ (0.2M) | 19.73 | 4.02 | 20.4 | 10.1 |
| $Na_2CO_3$(0.4M) + $NaHCO_3$ (0.2M) | 9.43 | 2.00 | 21.2 | 9.5 |
| Buffer (pH = 7) | 3.83 | 1.04 | 27.2 | 6.9 |
| $Na_2SO_4$ | 9.48 | 2.64 | 27.8 | 7.5 |
| $HNO_3$ | 5.31 | 1.76 | 33.1 | 1.6 |
| 0.01M sodium hydroxide | 21.69 | 7.13 | 32.9 | — |
| 0.1M sodium hydroxide: Trial A | 11.92 | 6.66 | 55.9 | |
| 0.1M sodium hydroxide: Trial B | 23.61 | 13.37 | 56.6 | |
| 1M sodium hydroxide: Trial A | 11.69 | 11.17 | 95.6 | |
| 1M sodium hydroxide: Trial B | 12.11 | 10.1 | 83.4 | |
| 0.5M NHA | 3.79 | 3.06 | 80.7 | |
| 0.0475M NHA | 7.15 | 6.25 | 87.5 | |
| 5% Copol 1 | 13.28 | 13.1 | 98.6 | |

The invention claimed is:

1. Use of an aqueous solution or slurry comprising at least one alkylene glycol polymer and/or at least one alkylene glycol copolymer in which the alkylene(s) has (have) from 2 to 6 carbon atoms, for trapping ruthenium present in a gaseous effluent.

2. Use according to claim 1, in which the alkylene glycol polymer is selected from the group consisting of polyethylene glycol, polypropylene glycol, polybutylene glycol, or a blend of these.

3. Use according to claim 1, in which the alkylene glycol copolymer is a copolymer consisting of polymers selected from the group consisting of polyethylene glycol, polypropylene glycol and polybutylene glycol or a blend of these.

4. Use according to claim 1, in which the alkylene glycol copolymer is a copolymer based on ethylene glycol, propylene glycol and butylene glycol.

5. Use according to claim 1, in which the alkylene glycol copolymer is of the following formula (I):

$$HO-(CH_2-CH_2O)_m-(\underset{\displaystyle CH_3}{\underset{|}{CH}}-CH_2O)_p-(CH_2-CH_2O)_m-H$$

in which m and p are integers such that, independently, $1 \leqq m \leqq 8$ and $3 \leqq p \leqq 12$.

6. Use according to claim 1, in which the alkylene glycol copolymer is an ethylene glycol/propylene glycol copolymer.

7. Use according to claim 1, in which the aqueous solution or slurry is placed on a substrate made of fibres.

8. Use according to claim 7, in which the substrate consists of a glass wool or a stainless steel wool.

9. Use according to claim 7, in which the alkylene glycol polymer or the alkalene glycol copolymer is placed on the said substrate by dipping the substrate into an aqueous solution of the said polymer or of the said copolymer.

10. Use according to claim 1, in which the alkylene glycol polymer or alkylene glycol copolymer has hydroxyl end groups.

11. Ruthenium-trapping cartridge, the said cartridge comprising a substrate on which an alkylene glycol polymer or an alkylene glycol copolymer is placed, in which the alkylene(s) has (have) from 2 to 6 carbon atoms.

12. Cartridge according to claim 11, in which the alkylene glycol polymer is selected from the group consisting of polyethylene glycol, polypropylene glycol and polybutylene glycol.

13. Cartridge according to claim 11, in which the alkylene glycol copolymer is a copolymer consisting of polymers selected from the group consisting of polyethylene glycol, polypropylene glycol and polybutylene glycol.

14. Cartridge according to claim 11, in which the alkylene glycol copolymer is a copolymer based on ethylene glycol, propylene glycol and butylene glycol.

15. Cartridge according to claim 11, in which the alkylene glycol copolymer is of the following formula (I):

$$HO-(CH_2-CH_2O)_m-(\underset{\displaystyle CH_3}{\underset{|}{CH}}-CH_2O)_p-(CH_2-CH_2O)_m-H$$

in which m and p are integers such that, independently, $1 \leqq m \leqq 8$ and $3 \leqq p \leqq 12$.

16. Cartridge according to claim 11, in which the alkylene glycol copolymer is an ethylene glycol/propylene glycol copolymer, of a copolymer.

17. Cartridge according to claim 11, in which the substrate consists of fibres.

18. Cartridge according to claim 11, in which the substrate consists of a glass wool or a stainless steel wool.

19. Cartridge according to claim 11, in which the said alkylene glycol polymer or the said alkylene glycol copolymer is placed on the said surface by dipping the substrate into an aqueous solution of the said polymer or of the said copolymer.

20. Cartridge according to claim 11, the said cartridge furthermore including a structure that supports the substrate on which the alkylene glycol polymer or copolymer is placed.

21. Cartridge according to claim 11, comprising:

the substrate on which the alkylene glycol polymer or copolymer is placed, the said surface being in the form of glass wool or stainless steel wool;

a structure supporting the said substrate on which the alkylene glycol polymer or copolymer has been placed; and peripheral means for sealing the said cartridge, making it necessary for the gaseous effluent to pass through the said substrate.

22. Use according to claim 1, in which the aqueous solution is added to the scrubbing water of a gas scrubbing unit.

* * * * *